United States Patent
Meinert et al.

(10) Patent No.: US 11,328,103 B2
(45) Date of Patent: May 10, 2022

(54) INVERSE SIMULATING A PLURALITY OF FIBERS

(71) Applicant: The Procter & Gamble Company, Cincinnati, OH (US)

(72) Inventors: Knut Meinert, Lampertheim (DE); Dominik L Michels, Bonn (DE)

(73) Assignee: The Procter and Gamble Company, Cincinnati, OH (US)

( * ) Notice: Subject to any disclaimer, the term of this patent is extended or adjusted under 35 U.S.C. 154(b) by 518 days.

(21) Appl. No.: 16/288,219

(22) Filed: Feb. 28, 2019

(65) Prior Publication Data

US 2019/0197207 A1  Jun. 27, 2019

Related U.S. Application Data

(63) Continuation of application No. PCT/US2017/051711, filed on Sep. 15, 2017.

(30) Foreign Application Priority Data

Sep. 15, 2016 (EP) ..................................... 16188947
Feb. 27, 2017 (EP) ..................................... 17158192

(51) Int. Cl.
*G06G 7/50* (2006.01)
*G06F 30/20* (2020.01)
(Continued)

(52) U.S. Cl.
CPC .............. *G06F 30/20* (2020.01); *G06F 30/17* (2020.01); *G06N 3/10* (2013.01); *G06T 7/20* (2013.01);
(Continued)

(58) Field of Classification Search
CPC .. G06N 3/10; G06T 7/20; G06T 13/40; G06T 13/20; G06T 13/60; G06F 30/17; G06F 30/20
(Continued)

(56) References Cited

U.S. PATENT DOCUMENTS 7,450,122 B2  11/2008  Petrovic et al.
7,468,730 B2  12/2008  Petrovic et al.
(Continued)

OTHER PUBLICATIONS

All final and non-final office actions for U.S. Appl. No. 15/704,374.
(Continued)

*Primary Examiner* — Andre Pierre Louis
(74) *Attorney, Agent, or Firm* — John G. Powell

(57) ABSTRACT

A computer-implemented method for inverse simulation of a plurality of fibers. The method comprises: providing a computational model for describing mechanical behavior of fibers; obtaining target geometry information describing a target configuration or dynamical behavior of the plurality of fibers; and inverse simulating the behavior of the plurality of fibers, using the computational model and the target geometry information, to calculate a target set of fiber mechanical parameters for the plurality of fibers. Fibers with the calculated target set of fiber mechanical parameters exhibit the target configuration or dynamical behavior. In some embodiments, the inverse simulation comprises using analysis-by-synthesis to help derive the target set of fiber mechanical parameters. In some embodiments, the inverse simulation uses a neural network to infer information about fiber mechanical parameters from the target geometry information. The invention also provides a method of training the neural network.

11 Claims, 5 Drawing Sheets

(51) Int. Cl.
| | |
|---|---|
| *G06F 30/17* | (2020.01) |
| *G06T 13/20* | (2011.01) |
| *G06T 13/40* | (2011.01) |
| *G06T 13/60* | (2011.01) |
| *G06N 3/10* | (2006.01) |
| *G06T 7/20* | (2017.01) |
| *G06F 111/06* | (2020.01) |
| *G06F 111/10* | (2020.01) |

(52) U.S. Cl.
CPC ............ *G06T 13/20* (2013.01); *G06T 13/40* (2013.01); *G06T 13/60* (2013.01); *G06F 2111/06* (2020.01); *G06F 2111/10* (2020.01); *G06T 2210/21* (2013.01); *G06T 2210/24* (2013.01)

(58) Field of Classification Search
USPC .......................................................... 703/6, 7
See application file for complete search history.

(56) References Cited

U.S. PATENT DOCUMENTS

| | | | | |
|---|---|---|---|---|
| 8,743,124 | B2* | 6/2014 | Audoly | ................... G06T 13/40 345/473 |
| 8,803,887 | B2 | 8/2014 | McAdams et al. | |
| 2005/0212800 | A1 | 9/2005 | Petrovic | |
| 2014/0198108 | A1* | 7/2014 | Sigal | ....................... G06T 13/40 345/474 |
| 2019/0035149 | A1* | 1/2019 | Chen | ....................... G06T 7/50 |

OTHER PUBLICATIONS

Anonymous: "Artificial neural network—Wikipedia, the free encyclopedia", Jul. 11, 2015, https://en.wikipedia.org/w/index.php?title=Artificial_neural_network&oldid=670995295, p. 1, paragraph 1-2.
Bergou et al., "Discrete elastic rods", ACM Transactions on Graphics (TOG), ACM, US, vol. 27, No. 3, Aug. 2008, pp. 1-63.
Derouet-Jourdan et al, "Inverse dynamic hair modeling with frictional contact", ACM transactions on Graphics (TOG), ACM, US, vol. 32, No. 6, Nov. 2013, pp. 1-159.
European Search Report for EP16188947.2 dated Mar. 20, 2017.
Kelly Ward et al., "A survey on hair modeling: styling, simulation and rendering", IEEE Transactions on Visualization and Computer Graphics, IEEE Service Center, Los Alamitos, CA, US, vol. 12, No. 2, Mar. 2007, pp. 213-234.
Klaus Mosegaard et al: "Monte Carlo analysis of inverse problems", Inverse Problems, vol. 18, No. 3, Jun. 2002, pp. R29-R54.
PCT International Search Report and Written Opinion for PCT/US2017/051457 dated Dec. 14, 2017.
PCT International Search Report and Written Opinion for PCT/US2017/051711 dated Oct. 27, 2017.
Tomas Lay Herrera et al., "Lighting hair from the inside: a thermal approach to hair reconstructions", ACM Transactions on Graphics (TOG), vol. 31, No. 6, Nov. 2012, pp. 1-146.
Wei-Chin Lin, "Boundary handling and porous flow for fluid-hair interactions", Computers and Graphics, vol. 52, Jun. 27, 2015, pp. 33-42.
CM04723FQ Extended European Search Report and Search Opinion; Application No. 17158192.9 ; dated Aug. 4, 2019.

* cited by examiner

INVERSE SIMULATING A PLURALITY OF FIBERS

FIELD OF THE INVENTION

The present invention relates to a computer-implemented method for inverse simulating a plurality of fibers. The method may be applied in particular for inverse simulating a tress or head of hair. It can also be applied for inverse simulating woven or nonwoven fabrics, brushes, or other products incorporating fibrous material.

BACKGROUND OF THE INVENTION

Computer simulation of physical systems is known and used in many technical fields. Applications of simulation include (but are not limited to) computer graphics and structural simulation. It is generally desirable for computer simulations to be as realistic as possible, in order to capture and predict the real world behavior of a system as accurately as possible. The present invention is concerned in particular with simulating a plurality of fibers.

Assemblies of fibers can be challenging to simulate, both because of the sheer number of elements to be considered and the potential complexity of the interactions between them. It would be desirable to simulate fibers, such as hair fibers, in a way that was more faithful to the mechanical behavior of those fibers in the real world. Better simulation of fibers could be useful for computer graphics animation of hair; for structural simulation of fiber-containing articles such as brushes; and for many other applications.

Known simulation approaches of this kind use a process of "forward" simulation. This involves simulating the behavior of the plurality of fibers based on pre-existing knowledge about the parameters governing that behavior. This presents a problem, in that determining the parameters may be difficult, time-consuming, or in some cases impossible, for given fibers. It may sometimes require invasive and/or destructive tests on real fibers. In some instances, the resulting parameters may also be sensitive to the test conditions or to variance in the measurements, potentially leading to inaccuracy. It would be desirable to find a better way of determining the parameters.

SUMMARY OF THE INVENTION

The present inventors have recognized that fiber mechanical parameters can be determined by inverse simulation of an assembly of fibers. Here, "inverse" simulation refers to a reversal of the normal forward simulation, which can allow the parameters of the fibers to be inferred based on observations of the fibers' behavior, using similar computational models to those used for forward simulation. Such an inverse simulation would also have wider utility in other applications in which it is important to analyze or predict the mechanical characteristics of fibers.

The invention is defined by the claims. According to a first aspect of the present invention there is provided a computer-implemented method for inverse simulation of a plurality of fibers, the method comprising:

providing a computational model for describing mechanical behavior of fibers;

obtaining target geometry information describing a target configuration or dynamical behavior of the plurality of fibers; and inverse simulating the behavior of the plurality of fibers, using the computational model and the target geometry information, to calculate a target set of fiber mechanical parameters for the plurality of fibers, such that fibers with the calculated target set of fiber mechanical parameters would exhibit the target configuration or dynamical behavior.

The target set of fiber mechanical parameters are calculated such that the plurality of fibers would exhibit the target configuration or dynamical behavior if those fiber mechanical parameters were imparted to the plurality of fibers.

Alternatively, if the target configuration or dynamical behavior relates to real physical fibers, the target set of fiber mechanical parameters can describe those fibers.

The target geometry information may comprise an image or video of a plurality of fibers.

The image of the plurality of fibers may show the fibers in a steady-state static configuration. The video of the plurality of fibers may show the fibers moving in response to a mechanical stimulus such as an impulse or oscillatory motion.

The target geometry information may comprise a description of the three-dimensional positions of a plurality of segments of each of the fibers.

Three-dimensional position information may be provided as an alternative to visual input such as an image or video, but preferably is provided in addition to this visual input.

The computational model may model each fiber as a chain of segments.

The geometry information may also comprise a junction distribution among fibers of the predetermined type. Alternatively, the junction distribution may be implicit in the geometry information and/or may be determined from it by simulation.

The geometry information may further comprise a velocity of each of the plurality of segments of each of the fibers.

The geometry information may be obtained from a real sample of fibers and the step of obtaining the geometry information preferably comprises at least one of: micro computed tomography; laser scanning; IR-imaging; and optical coherence tomography. Micro computed tomography is sometimes also referred to as micro-CT, high-resolution x-ray tomography, high-resolution CT (HRCT), or high-resolution micro-CT.

Obtaining geometry information from a real sample of fibers in this way can allow more accurate capture of fiber geometry.

The computational model may comprise at least one of: a Cosserat rod for each fiber; a finite-element based description for each fiber; a Kirchoff rod for each fiber; and an oscillator network for each fiber.

Optionally, the oscillator network for each fiber may comprise a cuboidal or tetrahedral oscillator network.

The computational model preferably also takes into account environmental conditions, including but not limited to: temperature, humidity, and stochastic wind effects.

Inverse simulating the behavior of the plurality of fibers preferably comprises applying the target geometry information to the inputs of a neural network.

The input to the neural network may comprise an image or video of a plurality of fibers.

It has been found that a suitably trained neural network can be particularly good at making a first set of inferences about the fiber parameters.

The output of the neural network preferably comprises a range of values for each parameter in the target set of fiber mechanical parameters.

This approach effectively uses the neural network to reduce the size of the parameter space that needs to be searched to determine the fiber mechanical parameters.

Each range of values may be defined by a maximum and minimum value of the range.

The neural network may comprise a multilayer neural network. The neural network may include recurrent connections, wherein the outputs of one layer of the network are coupled to the inputs of a preceding layer of the network.

The neural network preferably comprises a number of nodes in the range 30 to 1800.

Inverse simulating the behavior of the plurality of fibers optionally comprises: generating a plurality of modified sets of fiber mechanical parameters; for each of the modified sets, simulating, using the computational model, the configuration or dynamical behavior that is produced in the plurality of fibers by that modified set; and selecting as the target set the modified set which produces the configuration or dynamical behavior that best approximates the target geometry information.

This applies an approach of analysis-by-synthesis, preferably deriving the target set of fiber mechanical parameters by iterating the forward simulation with different sets of fiber mechanical parameters.

Inverse simulating the behavior of the plurality of fibers preferably comprises applying the target geometry information to the inputs of a neural network, wherein the output of the neural network preferably comprises a range of values for each parameter in the target set of fiber mechanical parameters; and the plurality of modified sets of fiber mechanical parameters are preferably generated based on the range of values output by the neural network for each parameter.

In this approach, the neural network is used to reduce the parameter space to be searched and then the analysis-by-synthesis technique is applied in order to deduce the fiber mechanical parameters within that reduced parameter space.

In some embodiments, the plurality of modified sets of fiber mechanical parameters may be generated based on the midpoint of the range for each parameter. For example, the midpoint may be used as an initial value for each parameter in an optimization algorithm.

Generating a plurality of modified sets of fiber mechanical parameters optionally comprises using an optimization algorithm suitable for escaping local minima, such as simulated annealing or an evolutionary algorithm.

It has been found that the reduced parameter space produced by using a neural network may have many local minima Optimization methods such as gradient descent can be used in this parameter space, but may get "stuck" in a local minimum, leading to a sub-optimal set of fiber mechanical parameters. Optimization algorithms that include measures for escaping local minima may have a greater chance of finding a globally optimal set of parameters.

The target set of fiber mechanical parameters preferably includes at least one, any two, or all three of: one or more coefficients of friction between the fibers; a measure of cohesion among the fibers; and a measure of adhesion among the fibers.

The present inventors have recognized that there is a need for better characterization of the mechanical parameters of fibers in general and of hair fibers in particular. Whereas previous approaches have focused on the stiffness or flexibility of individual fibers, the present inventors have found that accurate characterization of the interactions between fibers is important for the overall accuracy of a simulation of a plurality of fibers. The behavior of a body made of fibers is influenced by the complex network of collisions (contact points) between the fibers, and how the fibers interact when they collide. Friction, cohesion, and adhesion have been found to be the three most important parameters governing interactions between fibers.

Adhesion refers to a force that opposes the separation of two hair fibers that are in contact with one another, where there is no liquid present at the point of contact.

Cohesion refers to a force that opposes the separation of two hair fibers that are in contact with one another, where there is a liquid present between them at the point of contact. Cohesion depends on capillary forces and the Laplace pressure.

The cohesion and adhesion forces are preferably normalized by the area of contact, in the set of fiber mechanical parameters.

Preferably, the first set of fiber mechanical parameters includes two or more coefficients of friction, wherein each coefficient of friction pertains to a different mutual orientation. This can allow anisotropic friction effects to be described.

The target set of fiber mechanical parameters preferably further includes at least one, any two, or all three of: a Young's modulus associated with the fibers; a shear or torsional modulus associated with the fibers; and a bending modulus associated with the fibers.

The parameters characterizing interactions between fibers are preferably combined with an accurate characterization of the mechanical characteristics of the individual fibers. In particular, it is advantageous to characterize the flexibility of individual fibers in sufficient detail. In this regard, the Young's modulus, the bending modulus and the torsional modulus have been found to be the most important parameters. Torsional modulus is related to shear modulus.

The target set of fiber mechanical parameters preferably further includes at least one, any two, or all three of: a diameter associated with the fibers; a material density of the fibers; and a cross-sectional shape or an ellipticity associated with the fibers.

It is advantageous to combine these other fiber mechanical parameters with the parameters discussed above characterizing interactions and characterizing the flexibility of individual fibers.

According to a second aspect of the invention, there is provided a computer-implemented method for training a neural network, the method comprising:
  (i) for each of a plurality of types of fibers:
    obtaining a set of fiber mechanical parameters associated with the type of fibers; and
    obtaining training geometry information describing a configuration or dynamical behavior of a plurality of fibers having those fiber mechanical parameters, and
  (ii) using the sets of fiber mechanical parameters and the training geometry information, training the neural network to infer mechanical parameter information from geometry information of fibers,
  wherein the training geometry information comprises synthetic training geometry information that is generated by computer-simulating the behavior of a plurality of fibers having the respective set of fiber mechanical parameters.

Successful training of the neural network, to enable it to generalize to unseen data, requires sufficient training data to be available. Generating large quantities of real training data may be difficult or time-consuming. The present inventors have recognized that forward simulation of fibers can be used as a way to generate synthetic training data. This can dramatically increase the quantity and richness of the training data available, thereby improving the subsequent ability of the neural network to make accurate inferences about fiber mechanical parameters.

The training geometry information preferably comprises an image or video of the plurality of fibers.

The mechanical parameter information to be inferred by the neural network may comprise a range of values for each parameter in the set of fiber mechanical parameters.

The step of obtaining training geometry information preferably comprises: computer-simulating the behavior of a plurality of fibers having the respective set of fiber mechanical parameters; and rendering a visual representation of the simulated behavior.

In this way, the forward simulation is used to simulate and then render one or more images (or a video) of virtual fibers in a virtual configuration or behavior. Because the forward simulation is physically realistic, the rendered virtual images or video can closely approximate images or video of real fibers.

Also provided is a non-transitory computer readable storage medium comprising a computer program comprising computer readable program code operable to cause one or more physical computing devices to perform all the steps of any one of the preceding claims, when the computer program is run on said one or more physical computing devices.

BRIEF DESCRIPTION OF THE DRAWINGS

The invention will now be described by way of example, with reference to the accompanying drawings, in which.

DETAILED DESCRIPTION OF THE INVENTION

This application claims the benefit of European Patent Application No. 16188947.2, filed on 15 Sep. 2016, the entirety of which is incorporated by reference herein.

Figure 1:
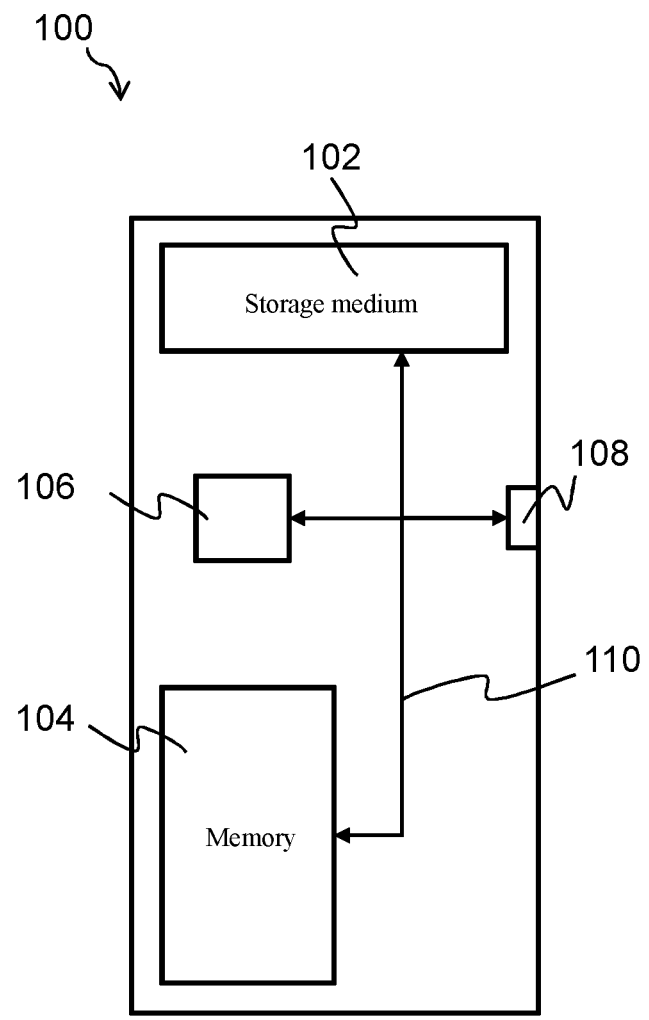
FIG. 1 is a schematic block diagram illustrating an exemplary computer system upon which embodiments of the invention may run.

FIG. 1 of the accompanying drawings schematically illustrates an exemplary computer system 100 upon which embodiments of the present invention may run. The exemplary computer system 100 comprises a computer-readable storage medium 102, a memory 104, a processor 106 and one or more interfaces 108, which are all linked together over one or more communication busses 110. The exemplary computer system 100 may take the form of a conventional computer system, such as, for example, a desktop computer, a personal computer, a laptop, a tablet, a smart phone, a smart watch, a virtual reality headset, a server, a mainframe computer, and so on.

The computer-readable storage medium 102 and/or the memory 104 may store one or more computer programs (or software or code) and/or data. The computer programs stored in the computer-readable storage medium 102 may include an operating system for the processor 106 to execute in order for the computer system 100 to function. The computer programs stored in the computer-readable storage medium 102 and/or the memory 104 may include computer programs according to embodiments of the invention or computer programs that, when executed by the processor 106, cause the processor 106 to carry out a method according to an embodiment of the invention The processor 106 may be any data processing unit suitable for executing one or more computer readable program instructions, such as those belonging to computer programs stored in the computer-readable storage medium 102 and/or the memory 104. As part of the execution of one or more computer-readable program instructions, the processor 106 may store data to and/or read data from the computer-readable storage medium 102 and/or the memory 104. The processor 106 may comprise a single data processing unit or multiple data processing units operating in parallel or in cooperation with each other. The processor 106 may, as part of the execution of one or more computer readable program instructions, store data to and/or read data from the computer-readable storage medium 102 and/or the memory 104.

The one or more interfaces 108 may comprise a network interface enabling the computer system 100 to communicate with other computer systems across a network. The network may be any kind of network suitable for transmitting or communicating data from one computer system to another. For example, the network could comprise one or more of a local area network, a wide area network, a metropolitan area network, the internet, a wireless communications network, and so on. The computer system 100 may communicate with other computer systems over the network via any suitable communication mechanism/protocol. The processor 106 may communicate with the network interface via the one or more communication busses 110 to cause the network interface to send data and/or commands to another computer system over the network. Similarly, the one or more communication busses 110 enable the processor 106 to operate on data and/or commands received by the computer system 100 via the network interface from other computer systems over the network.

The interface 108 may alternatively or additionally comprise a user input interface and/or a user output interface. The user input interface may be arranged to receive input from a user, or operator, of the system 100. The user may provide this input via one or more user input devices (not shown), such as a mouse (or other pointing device, track-ball or keyboard. The user output interface may be arranged to provide a graphical/visual output to a user or operator of the system 100 on a display (or monitor or screen) (not shown). The processor 106 may instruct the user output interface to form an image/video signal which causes the display to show a desired graphical output. The display may be touch-sensitive enabling the user to provide an input by touching or pressing the display.

According to embodiments of the invention, the interface 108 may alternatively or additionally comprise an interface to a measurement system, for measuring fiber mechanical parameters of real fibers. In some embodiments, the interface 108 may comprise an interface to a geometry capture system, such as a 3-D scanner, for capturing the geometry of a plurality of real fibers. In some embodiments, the interface 108 may comprise an interface to a camera, for capturing an image or video of a plurality of real fibers.

It will be appreciated that the architecture of the computer system 100 illustrated in FIG. 1 and described above is merely exemplary and that systems having different architectures using alternative components or using more components (or fewer) may be used instead.

In the following, the invention will be described in the context of embodiments in which the fibers are hair fibers. However, as will be apparent to those skilled in the art, the scope of the invention is not limited to such embodiments and it can be used to simulate any type of fiber.

It will be convenient firstly to describe an example of a forward simulation method suitable for use in an embodiment of the invention, since some embodiments of the inverse simulation method according to the invention utilize a forward simulation in various ways.

Figure 2:
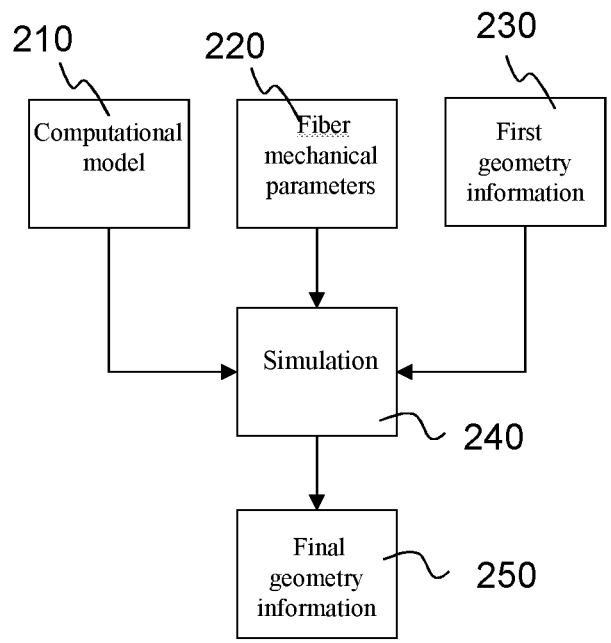
FIG. 2 is a flow diagram showing a logical information flow in a forward simulation method which may be used in an embodiment of the invention.

FIG. 2 illustrates a logical information flow in a forward simulation that may be used in embodiments of the invention. A simulation 240 of a plurality of fibers relies on three pieces of information: a computational model 210; a set of fiber mechanical parameters 220; and initial geometry information 230. The simulation 240 combines these to simulate a change in configuration of the plurality of fibers. The new configuration is represented by final geometry information 250.

The computational model 210 preferably models each fiber as a chain of individual segments. The first geometry information 230 provides the initial positions for each of the segments of each fiber. The simulation 240 steps incrementally forward in time, starting from these initial positions (and optionally also information about initial velocities), using the computational model 210 to describe the mechanical behavior of the system of fibers. The mechanical response of the computational model 210 is governed by the values of the fiber mechanical parameters 220.

In this example, the fibers are hair fibers and the aim is to simulate how the hair fibers behave—for example, how they fall under gravity to reach a steady-state (static) geometric configuration, or how they respond to an input mechanical stimulus or perturbation such as an impulse or oscillating motion. The hair fibers may form a small tress of hair or a full head of hair. The behavior to be simulated may be a virtual representation of a real (that is, physically realizable) modification or manipulation of the hair.

Figure 3:
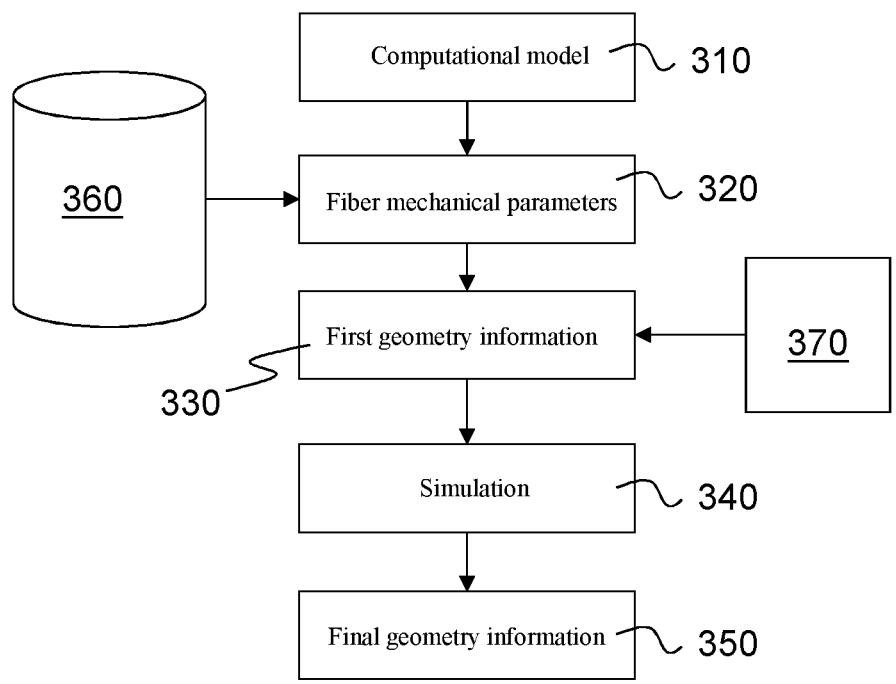
FIG. 3 is a flowchart of a forward simulation method that may be used in an embodiment.

FIG. 3 is a flowchart of an exemplary forward simulation method. In step 310, the computational model 210 is provided. The computational model 210 may be stored in the storage medium 102 from where it is retrieved by the processor 106. Next, in step 320, the processor 106 obtains a first set of fiber mechanical parameters associated with fibers of a predetermined type, for use with the computational model 210. In step 330, the processor 106 obtains first geometry information 230 describing the initial shape and position of the plurality of fibers to be simulated. Then, in step 340, the processor 106 uses the computational model 210, the fiber mechanical parameters 220, and the first geometry information 230 to simulate the behavior of the fibers. The output of the simulation is second geometry information, describing the resulting shape, position and/or motion of the fibers. Optionally, in step 350, the processor 106 renders one or more images of the fibers, based on the second geometry information produced by the simulation.

In the embodiment pictured in FIG. 3, the first geometry information 230 is obtained from a real sample of fibers. Specifically, the processor 106 obtains the geometry information from Optical Coherence Tomography (OCT) apparatus 370. OCT apparatus 370 is interfaced to the computer system 100 via interface 108. Optical coherence tomography can be used to capture the 3-D geometry of a body of hair fibers as it is sensitive to differences in the refractive index of materials. OCT can allow individual structures to be resolved with high-resolution. The real sample of fibers used to generate the geometry information may be a small tress of hair or a full head of hair.

In the method of FIG. 3, it is assumed that the fiber mechanical parameters are obtained from a database 360, which stores fiber mechanical parameters for each of a plurality of different hair types. This is described in more detail in EP 16188947.2. However, as will be described in greater detail below, when the forward simulation is used in an inverse simulation according to an embodiment of the present invention, the fiber mechanical parameters may be obtained differently.

In the present example, the set of fiber mechanical parameters comprises a hair mechanical fingerprint including six parameters. Three parameters define the interactions between hair fibers; these are: at least one coefficient of friction between fibers; the cohesion among fibers; and the adhesion among fibers. Three further parameters define the mechanical characteristics of individual fibers; these are: the Young's modulus of the fibers; the torsional modulus of the fibers; and the bending modulus of the fibers. Preferably, the set of fiber mechanical parameters also includes: the diameter of the fibers; the ellipticity of the cross-sectional shape of the fibers; and the material density of each fiber. These fiber mechanical parameters are described in greater detail in EP 16188947.2, together with exemplary methods for measuring each parameter directly from a real hair sample.

In the present example, the computational model describing each fiber is based on a Cosserat rod, discretized into segments. The Cosserat rod model itself will be familiar to those skilled in the art. The model also includes a measure of damping in the hair fiber system, which describes the interaction of the fibers with air or other gaseous substances and/or water or other liquids. The damping effect is a function of environmental conditions such as temperature and humidity; therefore, it is not part of the fiber mechanical parameters but rather a global parameter of the computational model.

Many variations are possible to the example described above. For example, the 3-D fiber geometry information may be obtained in different ways. Among the possible alternatives are laser scanning and micro computed tomography ($\mu$-CT), both of which are discussed in EP 16188947.2. In principle, any CT variant that has sufficient resolution to resolve a single hair fiber can be used.

Figure 4:
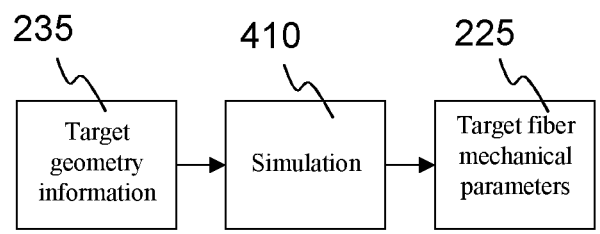
FIG. 4 is a flow diagram showing a logical information flow in an inverse simulation according to a first aspect of the invention.

FIG. 4 is a schematic flow diagram showing the logical information flow according to an inverse simulation method according to an embodiment of the first aspect of the invention. The input to the method is target geometry information 235. This may represent, for example, a desired hairstyle that a stylist wishes to achieve for a customer, or a desired dynamic behavior of a tress of hair. This target geometry information 235 is used by an inverse simulation 410 to derive a target-set of fiber mechanical parameters 225. The target-set is a set of fiber mechanical parameters that—if achieved—would allow the desired hairstyle (as defined by the target geometry information) to be created.

In essence, the inverse simulation method infers the target set of fiber mechanical parameters from the target geometry information, using the computational model. If the target geometry information is hypothetical (as in the preceding examples), then the output of the inverse simulation is a set of hypothetical fiber mechanical parameters. However, if the target geometry information is real observed geometry information, then the "target" set of fiber mechanical parameters would be the real fiber mechanical parameters of the observed fibers.

Figure 5:
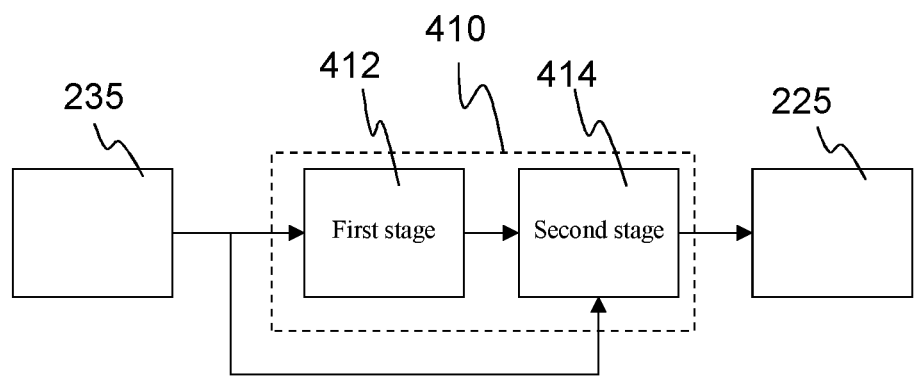
FIG. 5 is a more detailed flow diagram according to one embodiment of the first aspect.

In a preferred embodiment, as shown in FIG. 5, the inverse simulation 410 comprises two stages: a first stage 412 uses a neural network to reduce the parameter space, and a second stage 414 use analysis-by-synthesis to determine the fiber mechanical parameters from within the reduced parameter space.

This preferred embodiment will now be described in greater detail, with reference to FIG. 6. This is a combined information and process flow diagram illustrating a method for inverse simulation according to an embodiment. In step 610, the computational model is provided. The computational model may be the same as the computational model 210, as used in the method of FIG. 2, and it may similarly be retrieved by the processor 106 from the storage medium 102.

In step 620, the processor 106 obtains target geometry information describing target dynamical behavior of the plurality of fibers. As shown in FIG. 6, the target geometry information may comprise a video of the plurality of fibers which is obtained from a camera 625. The video may be a video of a so-called "free flow" experiment, in which a tress of hair fibers is attached to a sled on a horizontal track. The tress is suspended from a clamp on the sled so that the hair fibers hangs below the sled. The sled is moved from left to right and back again, causing the hair fibers to oscillate. The video of this simple experiment contains latent information about the mechanical behavior of the hair fibers, which the method will exploit to determine the fiber mechanical parameters of the tress.

The target geometry information preferably also comprises a substantially complete description of the three-dimensional positions of the fibers, approximating each fiber as a plurality of segments. This three-dimensional description can be obtained using OCT or one of the other suitable methods referred to above.

The method then proceeds to steps 630, 530, and 414, in which the inverse simulation is performed.

In step 630, the processor 106 applies some or all of the target geometry information to the input layer of a multilayer neural network. In the present embodiment, this step comprises inputting the video of the free flow experiment to the input of the neural network. The output of the neural network comprises a range of values for each parameter in the set of fiber mechanical parameters. That is, the neural network infers from the video of the free flow experiment the range in which each of the fiber mechanical parameter values lies. Training of the neural network to perform this task will be described in greater detail below.

Next, in step 530, the processor 106 initializes the analysis-by-synthesis method, based on the parameter ranges that were discovered by the neural network in step 630. In the present embodiment, the method is initialized with a set of fiber mechanical parameters in which each parameter value is the mean of the respective range discovered by the neural network. This ensures that the analysis-by-synthesis method starts from the center of the parameter space determined by the neural network.

Figure 6:
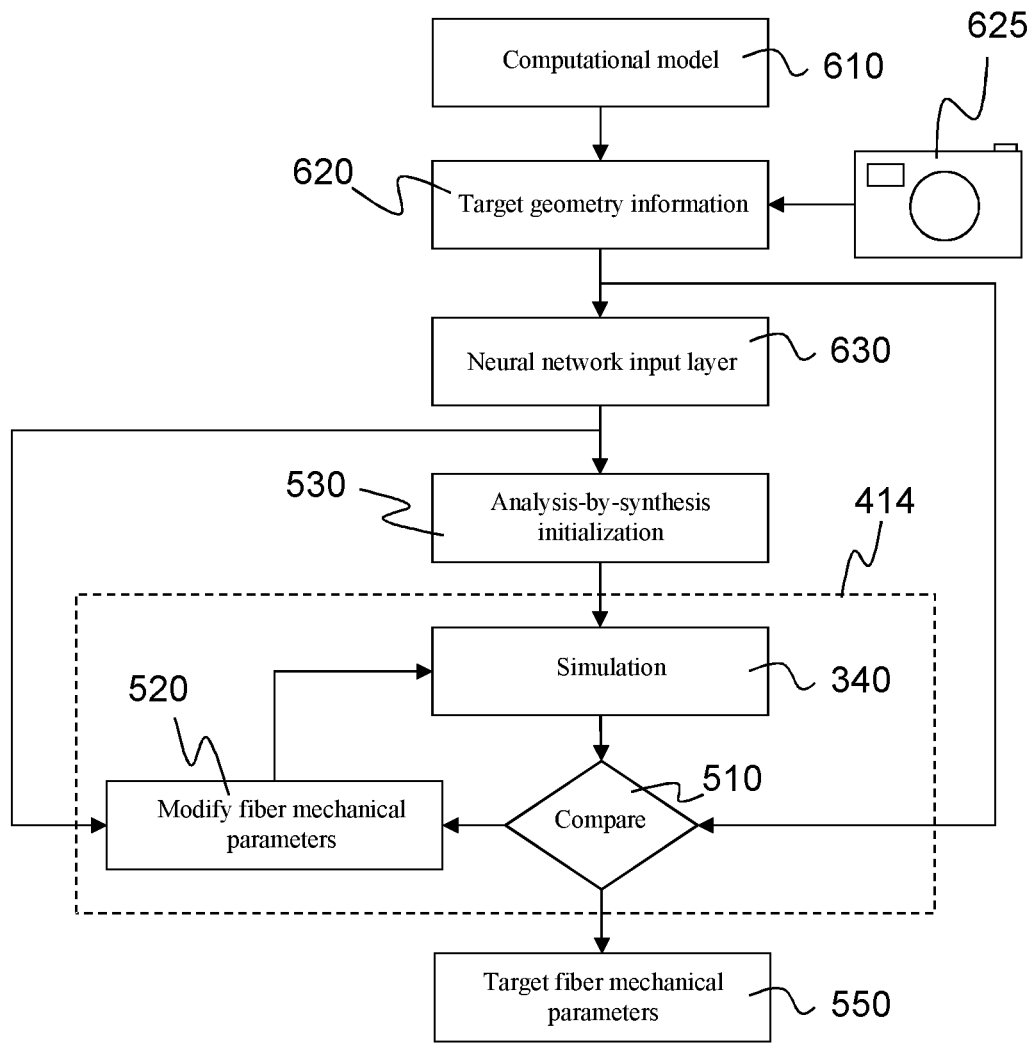
FIG. 6 is a flowchart illustrating a detailed example of an inverse simulation method according to an embodiment of the first aspect.

The detailed implementation of the analysis-by-synthesis stage is indicated inside the dashed rectangle 414 in FIG. 6.

In the illustrated embodiment, an iterative approach is applied. In step 340, the processor 106 simulates the behavior of a plurality of fibers having the initial set of fiber mechanical parameters, as determined in step 530. This is an instance of the forward simulation (the same as the forward simulation 340 described above in the context of FIG. 2). The way in which the behavior is simulated will depend on the form of the target geometry information. Using the example of the free flow experiment, described above, the processor 106 simulates the response of a plurality of fibers having the initial set of fiber mechanical parameters in an identical (virtual) free flow experiment. The output of the simulation is the resulting geometry information—in this case, describing the motion of the tress of virtual fibers in the simulated free flow experiment. Optionally, the forward simulation may also include rendering the result geometry information visually, as a video.

In step 510, the processor 106 compares this resulting geometry with the target geometry that was obtained in step 620. Assuming that the two geometries are not yet sufficiently similar, the method proceeds to step 520. In this step, the processor 106 modifies the set of fiber mechanical parameters. The method then returns to step 340 again, for the processor to simulate the behavior resulting from the application of the new modified fiber mechanical parameters. Again, the method proceeds to step 510, to check if the new resulting geometry information matches the target geometry sufficiently well. At each iteration, the fiber mechanical parameters are modified with the aim of driving the resulting geometry information towards the target geometry information. This can be achieved in a number of ways, using a number of possible strategies to adjust the parameters. Such strategies include but are not limited to: gradient descent methods; Monte Carlo methods; and genetic algorithms. However, it may be preferable to use an optimization algorithm that is designed to escape local minima, such as simulated annealing.

Note that, in the update step 520, the fiber mechanical parameters are always modified such that they remain within the ranges determined by the neural network in step 630.

When the method eventually determines, in step 510, that the current resulting geometry information is sufficiently similar to the target geometry, the iterations terminate. At that point, the modified fiber mechanical parameters from the final iteration are chosen as the target fiber mechanical parameters (step 550).

The comparison between the current resulting geometry information and the target geometry information can be performed in step 510 in a number of ways and iterations can be terminated based on several possible rules. For example, the iterations may continue until the sum of squared differences between the current geometry information and the target geometry information is less than a predefined threshold. Alternatively, the iterations may continue until the sum of squared differences ceases to reduce between iterations. Those skilled in the art will appreciate that the sum of squared differences is merely one of a number of possible suitable metrics to use for assessing the quality of the geometry.

In a preferred embodiment, the geometries can be compared using an L2 metric applied either to the three-dimensional position information or to the video data. In practice, it has been found beneficial to use the video data in the neural network stage 412 and to use the three-dimensional position information (if available) in the analysis-by-synthesis stage 414.

The method of FIG. 6 can provide a less invasive and potentially more accurate way to determine fiber mechanical parameters, when the target geometry information is observed geometry information of real fibers. However, the method is potentially even more useful when the target geometry information represents a hypothetical or desired configuration or dynamic behavior. In this case, there is no possibility for making actual physical measurements on real fibers, because the desired fibers do not exist yet in the real world. The inverse simulation method then provides a way to infer the fiber mechanical parameters that must be produced in order to achieve the desired/hypothetical configuration/behavior. This could be used to infer the fiber mechanical parameters that would (by way of example) allow a tress of hair to move with less frizz, more bounce, or less tangling.

Various modifications to the above described embodiments are possible.

In the example of FIG. 6, the inverse simulation 410 was conducted by iterating the forward simulation 340 and updating the fiber mechanical parameters in each iteration. However, in general, it is not necessary to follow an iterative approach. For example, a plurality of simulations 340 could be run in parallel, each using different fiber mechanical parameters. This could be combined with an iterative approach, by iterating each of the parallel simulations, in a similar manner to that described above. This may allow faster and/or broader exploration of the parameter space.

As those skilled in the art will appreciate, it is not essential to use the neural network as a preprocessing step for the analysis-by-synthesis method. In some embodiments, the neural network alone may be used to deduce the fiber mechanical parameters. Likewise, in other embodiments, the analysis-by-synthesis method may be used in isolation. However, it has been found that using a neural network as a preprocessing step, as described above, can increase the speed with which the analysis-by-synthesis converges to an accurate result, thereby improving the efficiency of the overall process.

Note also that, in some cases, some of the parameters may be determined by inverse simulation and other parameters may be determined by physical measurements. For example, the fiber diameter and/or elliptical cross-section of the fibers may be determined by direct physical measurement. This can help to reduce the dimensionality of the parameter space for inverse simulation, by making simple measurements offline. It can thereby increase the overall efficiency of the method.

As mentioned previously, the scope of the present invention is not limited to inverse simulation of hair fibers. The plurality of fibers to be inverse simulated may be fibers of any type. For example, they may be fibers in a woven or nonwoven textile, or fibers forming bristles of a brush. The geometry of the fibers need not be observed in isolation—for example, the interaction of fibers with other solid objects, liquids, or gases may be observed, to provide the input to the inverse simulation method. In one embodiment, the fibers to be simulated comprise the bristles of a toothbrush and the observation comprises observing the interaction of the bristles with teeth, gums, or other oral-cavity tissue. The output of the inverse simulation then comprises the mechanical parameters of the bristles of the toothbrush.

Figure 7:
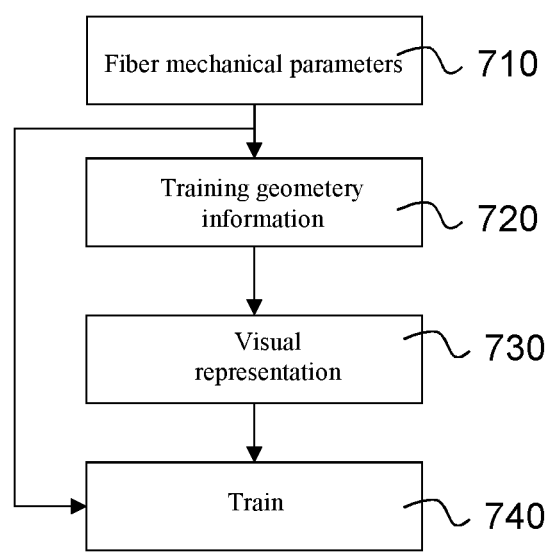
FIG. 7 is a flowchart illustrating a method of training a neural network according to an embodiment of a second aspect of the invention.

In order to support the use of the neural network 412 to infer information about the fiber mechanical parameters, it is first necessary to train the neural network. General methods for training neural networks are known and will be familiar to those skilled in the art. One training procedure that is believed to be particularly advantageous is illustrated in FIG. 7. This shows a flowchart for a method of training a neural network, according to an embodiment of the second aspect of the invention.

The neural network is preferably trained over a plurality of different types of fibers. In step 710, the processor 106 obtains, for each type of fiber, a set of fiber mechanical parameters associated with that fiber-type. In steps 720 and 730, the processor 106 obtains respective training geometry information, describing the dynamical behavior of fibers having these fiber mechanical parameters.

In general, the parameters and training geometry information could be obtained in any suitable way. In one example (not according to the second aspect, but still suitable for use for training a neural network for use in the first aspect) the training geometry information may comprise videos of respective free flow experiments conducted on a plurality of different types of real fiber. The associated fiber mechanical parameters may then be measured directly from the same real fiber samples.

However, the present inventors have recognized that it may be difficult, or at least laborious, to obtain sufficient real training data to achieve a high level of recognition-accuracy from the neural network. They have further recognized that this difficulty may be overcome by generating and using synthetic training data, provided that the synthetic data is adequately realistic. This is the approach adopted in the embodiment of FIG. 7.

In step 720, the processor 106 takes the fiber mechanical parameters that were obtained in step 710, and simulates the behavior of fibers having those parameters. This involves running, for each fiber-type, an instance of the forward simulation 340. The output of each simulation is a description of the dynamic behavior of the fibers in a simulated standard test, such as the free flow experiment discussed already above.

In step 730, the processor 106 renders a visual representation of this behavior. In the present example, the visual representation is a video showing the (virtual) free flow experiment. The rendering preferably uses computer graphics techniques to ensure that the resulting synthetic video is physically and visually realistic, to maximize its usefulness as training data for the neural network. One suitable technique for rendering photorealistic images and video of fibers is described in European patent application no. 14189661.3 (publication no. EP 3012805).

In step 740, the processor 106 uses the fiber mechanical parameters from step 710 and the synthetically rendered training geometry information from step 730 to train the neural network. The neural network is thus trained to recognize or infer mechanical parameter information from geometry information of fibers.

In the present embodiment, the neural network is a multilayer neural network with recurrent connections and of the order of a few hundred nodes, such as would be understood to be suitable for deep learning. If the neural network is overly complex (that is, if it has too many nodes) there may be a risk of over-fitting the training data. The precise characteristics of the neural network will depend to some extent on the quantity and type of training data used for training, as those skilled in the art will appreciate. With a large corpus of diverse training data, a larger number of nodes may be suitable. With a small corpus or training data that is highly clustered (not very diverse) a smaller number of nodes may work better. Training can use the well-known back-propagation method, or another suitable technique.

Note that the synthetic training data generated according to the method of FIG. 7 can be used alone to train the neural network, or it can be combined with real training data.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

Furthermore, in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

What is claimed is:

1. A computer-implemented method for inverse simulation of a plurality of fibers, the method comprising:
   providing a computational model to a processor, wherein the computation model is based on a Cosserat rod, discretized into segments, and describes a mechanical behavior of hair fibers;
   obtaining target geometry information describing a target configuration or dynamical behavior of the hair fibers using an optical coherence tomography apparatus interfaced to the processor; and
   inverse simulating the behavior of the plurality of fibers to calculate a target set of fiber mechanical parameters for the plurality of fibers, such that fibers with the calculated target set of fiber mechanical parameters would exhibit the target configuration or dynamical behavior, wherein the inverse simulation comprises applying the target geometry information to an input of a neural network to generate a range of values for each parameter in the set of fiber mechanical parameters and initializing an analysis-by-synthesis with the set of fiber mechanical properties, wherein each parameter value is the mean of the respective range discovered by the neural network.

2. The computer-implemented method of claim 1, wherein the target geometry information comprises an image or video of a plurality of fibers.

3. The computer-implemented method of claim 1, wherein the target geometry information comprises a description of a three-dimensional position of a plurality of segments of each of the fibers.

4. The computer-implemented method of claim 1, wherein the input to the neural network comprises an image or video of a plurality of fibers.

5. The computer-implemented method of claim 1, wherein an output of the neural network comprises a range of values for each parameter in the target set of fiber mechanical parameters.

6. The computer-implemented method of claim 1, wherein inverse simulating the behavior of the plurality of fibers comprises
   generating a plurality of modified sets of fiber mechanical parameters;
   for each of the modified sets, simulating, using the computational model, the configuration or dynamical behavior that is produced in the plurality of fibers by that modified set; and
   selecting as the target set the modified set which produces the configuration or dynamical behavior that best approximates the target geometry information.

7. The computer-implemented method of claim 6, wherein:
   the plurality of modified sets of fiber mechanical parameters are generated based on the range of values outputted by the neural network for each parameter.

8. The computer-implemented method of claim 6, wherein generating a plurality of modified sets of fiber mechanical parameters comprises using an optimization algorithm suitable for escaping local minima.

9. The computer-implemented method of claim 1, wherein the target set of fiber mechanical parameters is selected from the group consisting of one or more coefficients of friction between the fibers, a measure of cohesion among the fibers, a measure of adhesion among the fibers, and combinations thereof.

10. The computer-implemented method of claim 9, wherein the target set of fiber mechanical parameters further comprises a parameter selected from the group consisting of a Young's modulus associated with the fibers, a shear or torsional modulus associated with the fibers, a bending modulus associated with the fibers, and combinations thereof.

11. The computer-implemented method of claim 9, wherein the target set of fiber mechanical parameters further comprises a parameter selected from the group consisting of a diameter associated with the fibers, a material density of the fibers, a cross-sectional shape or an ellipticity associated with the fibers, and combinations thereof.

\* \* \* \* \*